US008036099B2

(12) United States Patent
Zangi et al.

(10) Patent No.: US 8,036,099 B2
(45) Date of Patent: Oct. 11, 2011

(54) METHOD AND APPARATUS FOR LINEARLY PRECODING DOWNLINK TRANSMISSIONS TO REDUCE TEMPORAL VARIATIONS IN INTERFERENCE

(75) Inventors: Kambiz C. Zangi, Chapel Hill, NC (US); Leonid Krasny, Cary, NC (US); Dennis Hui, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1068 days.

(21) Appl. No.: 11/850,781

(22) Filed: Sep. 6, 2007

(65) Prior Publication Data

US 2009/0069054 A1    Mar. 12, 2009

(51) Int. Cl.
*H04L 27/28* (2006.01)
*H04B 7/02* (2006.01)
*H04Q 7/00* (2006.01)

(52) U.S. Cl. ............... 370/208; 370/437; 455/562.1; 375/267; 375/299

(58) Field of Classification Search .......... 370/208–210, 370/281, 295, 344, 328, 329; 375/260, 267, 375/299, 346–348
See application file for complete search history.

(56) References Cited

U.S. PATENT DOCUMENTS

| 6,240,098 | B1 * | 5/2001 | Thibault et al. | 370/431 |
|---|---|---|---|---|
| 6,968,022 | B1 * | 11/2005 | Poor et al. | 375/346 |
| 2004/0190636 | A1 | 9/2004 | Oprea | |
| 2005/0002325 | A1 * | 1/2005 | Giannakis et al. | 370/208 |
| 2005/0141630 | A1 * | 6/2005 | Catreux et al. | 375/267 |
| 2007/0189149 | A1 * | 8/2007 | Terabe | 370/208 |
| 2007/0230405 | A1 * | 10/2007 | Yin et al. | 370/335 |
| 2008/0020772 | A1 * | 1/2008 | Shen et al. | 455/443 |
| 2008/0112310 | A1 * | 5/2008 | Choi et al. | 370/210 |

FOREIGN PATENT DOCUMENTS

| JP | 2006-148797 A | 6/2006 |
|---|---|---|
| WO | 97/08849 A1 | 3/1997 |

OTHER PUBLICATIONS

Xia, P. et al. "Design and Analysis of Transmit-Beamforming base on Limited-Rate Feedback." IEEE Transactions on Signal Processing, vol. 5, No. 5, May 2006, pp. 1853-1863.
3GPP TS 36.211, V1.0.0 (Mar. 2007). 3rd Generation Partnership Project; Technical Specification Group Radio Access Network; Physical Channels and Modulation (Release 8).

(Continued)

*Primary Examiner* — Ian N Moore
*Assistant Examiner* — Tam Phan
(74) *Attorney, Agent, or Firm* — Coats & Bennett, P.L.L.C.

(57) ABSTRACT

According to one or more method and apparatus embodiments taught herein, network base stations reduce temporal variations in the interference perceived by mobile stations operating within the network by slowing down the rate at which they change or otherwise update the linear precoding settings applied to their transmitted Orthogonal Frequency Division Multiplex (OFDM) signals in comparison to the rate at which the base stations perform link adaptation. That is, the precoding-related component of measured interference (e.g., other-cell interference) at the mobile stations is made quasi-stationary with respect to channel quality reporting and link adaptation intervals by fixing the preceding settings used by each base station over time intervals substantially longer than the channel reporting/link adaptation intervals.

16 Claims, 5 Drawing Sheets

OTHER PUBLICATIONS

Heo et al., "Effective Adaptive Transmit Power Allocation Algorithm Considering Dynamic Channel Allocation in Reuse Partitioning-Based OFDMA System," Wireless Personal Communications, Apr. 6, 2007, pp. 677-684, vol. 43, No. 2, Springer Science+Business Media B.V.

Svedman et al., "A QoS-aware Proportional Fair Scheduler for Opportunistic OFDM," 2004 IEEE 60th Vehicular Technology Conference, Sep. 26-29, 2004, pp. 558-562, vol. 1, IEEE, Piscataway, NJ, US.

Texas Instruments, "Feedback Reduction for Rank-1 Pre-Coding for E-UTRA Downlink," 3GPP TSG RAN WG1 #45 R1-061441, May 8-12, 2006, pp. 1-5, Athens, Greece.

Chae, Chan-Byoung et al. "MIMO Relaying with Linear Processing for Multiuser Transmission in Fixed Relay Networks." Aug. 2006 Draft Paper. Available at: http://users.ece.utexas.edu/~rheath/papers/2006/TSP_relay/paper.pdf.

Simon, Steven H. et al. "Optimizing MIMO Antenna Systems with Channel Covariance Feedback." IEEE Journal on Selected Areas in Communications, vol. 21, No. 3, Apr. 2003, pp. 406-417.

Tulino, Antonia M. et al. "Capacity-Achieving Input Covariance for Single-User Multi-Antenna Channels." IEEE Transactions on Wireless Communications, vol. 5, No. 3, Mar. 2006, pp. 662-671.

Visotsky, Eugene et al. "Space-Time Transmit Precoding with Imperfect Feedback." IEEE Transactions on Information Theory, vol. 47, No. 6, Sep. 2001, pp. 2632-2639.

Zangi, Kambiz C. et al. "Impact of Transmit Antenna Array Geometry on Downlink Data Rates in MIMO Systems." Available at: http://www.ew2007.org/papers/1569013862.pdf.

Co-pending U.S. Appl. No. 11/740,417, filed Apr. 26, 2007.
Co-pending U.S. Appl. No. 11/538,568, filed Oct. 4, 2006.

* cited by examiner

METHOD AND APPARATUS FOR LINEARLY PRECODING DOWNLINK TRANSMISSIONS TO REDUCE TEMPORAL VARIATIONS IN INTERFERENCE

BACKGROUND

1. Technical Field

The present invention generally relates to wireless communication networks, and particularly relates to a method and apparatus for linearly preceding downlink transmissions to reduce temporal variations in interference.

2. Background

Linear preceding, where different weighting vectors are applied to different signal components to control their transmission from multiple transmit antennas, has been shown capable of improving downlink throughput in wireless communication networks. The improvements, however, largely depend on the availability of instantaneous channel quality information with respect to the receiving mobile stations. Instantaneous channel quality information allows the supporting network transmitter(s) to adapt its (theirs) transmission to a given mobile station based on currently prevailing interference conditions at the mobile station.

In practice, however, network transmitters do not operate with instantaneous channel knowledge because there always is some delay between the time that mobile stations measure interference and report channel quality, and the time that a transmitter adapts a given mobile station's transmit link in response to the last reported channel quality. That delay means that the transmitter's link adaptations lag actual reception conditions at the mobile station, meaning its link adaptations are inappropriate to the extent that reception conditions at the mobile station change over the lag.

The particular linear precoding settings in use at a given base station, i.e., which Orthogonal Frequency Division Multiplex (OFDM) subcarriers are precoded with which weight sets, strongly influence the characteristics of interference caused by the base station's transmissions at nearby mobile stations. Thus, to the extent that these precoding settings change rapidly, the interference conditions at individual mobile stations also change rapidly.

SUMMARY

According to one or more method and apparatus embodiments taught herein, network base stations reduce temporal variations in the interference perceived by mobile stations operating within the network by slowing down the rate at which they change or otherwise update the linear precoding settings applied to their transmitted Orthogonal Frequency Division Multiplex (OFDM) signals in comparison to the rate at which the base stations perform link adaptation. That is, the precoding-related component of measured interference at the mobile stations is made quasi-stationary with respect to channel quality reporting and link adaptation intervals by fixing the precoding settings used by each base station over time intervals substantially longer than the channel reporting/link adaptation intervals.

In at least one embodiment, a method of reducing temporal variations in interference in a wireless communication network is implemented at each of one or more cells in the network. The method includes, in each cell, transmitting data to a plurality of mobile stations via an Orthogonal Frequency Division Multiplex (OFDM) signal comprising a plurality of subcarriers transmitted from two or more transmit antennas according to a fixed number of linear precoding weight sets.

The method also includes, for each cell, forming subcarrier sets by assigning each subcarrier to one of the weight sets, assigning each mobile station to one of the subcarrier sets, and restricting changes to the subcarrier sets to superframe interval boundaries.

In this context, the term "superframe interval" denotes a time interval defined to be at least several multiples of a channel quality measurement cycle time associated with the mobile stations. That cycle time represents, for example, the link adaptation lag associated with the base station(s) updating transmit data rates to individual ones of the mobile stations responsive to channel quality reports received from the mobile stations.

Accordingly, in one or more other embodiments taught herein, a base station is configured to reduce temporal variations in interference caused by its transmissions. The base station comprises transmission circuits and one or more supporting processing circuits. The transmission circuits are configured to transmit data to a plurality of mobile stations via an Orthogonal Frequency Division Multiplex (OFDM) signal comprising a plurality of subcarriers transmitted from two or more transmit antennas according to a fixed number of linear preceding weight sets. In turn, the one or more processing circuits are configured to form subcarrier sets by assigning each subcarrier to one of the linear precoding weight sets, assigning each mobile station to one of the subcarrier sets, and restricting changes to the subcarrier sets to superframe interval boundaries.

One or more other embodiments provide a method of reducing temporal variations in interference perceived by mobile stations operating in a wireless communication network. The method includes transmitting linearly precoded OFDM signals from a plurality of network base stations, restricting linear preceding at each base station to a defined number of linear preceding weight sets, and changing linear preceding settings across the plurality of network base stations synchronously only at superframe interval boundaries. The superframe interval is defined in at least one such embodiment to be at least several multiples of a link adaptation lag time existent in ongoing link adaptations performed by the network base stations with respect to individual ones of the mobile stations.

One or more other embodiments provide a method of reducing temporal variations in interference perceived by mobile stations operating in a wireless communication network that is based on maintaining fixed linear precoding settings at each base station in a plurality of base stations over a superframe interval. The superframe interval is substantially longer than a link adaptation interval. As before, the link adaptation interval is the lag associated with updating transmit data rates to individual ones of the mobile stations as a function of changing channel and interference conditions. The method also includes changing, as needed, the fixed linear preceding settings at each base station synchronously at the superframe interval boundaries.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
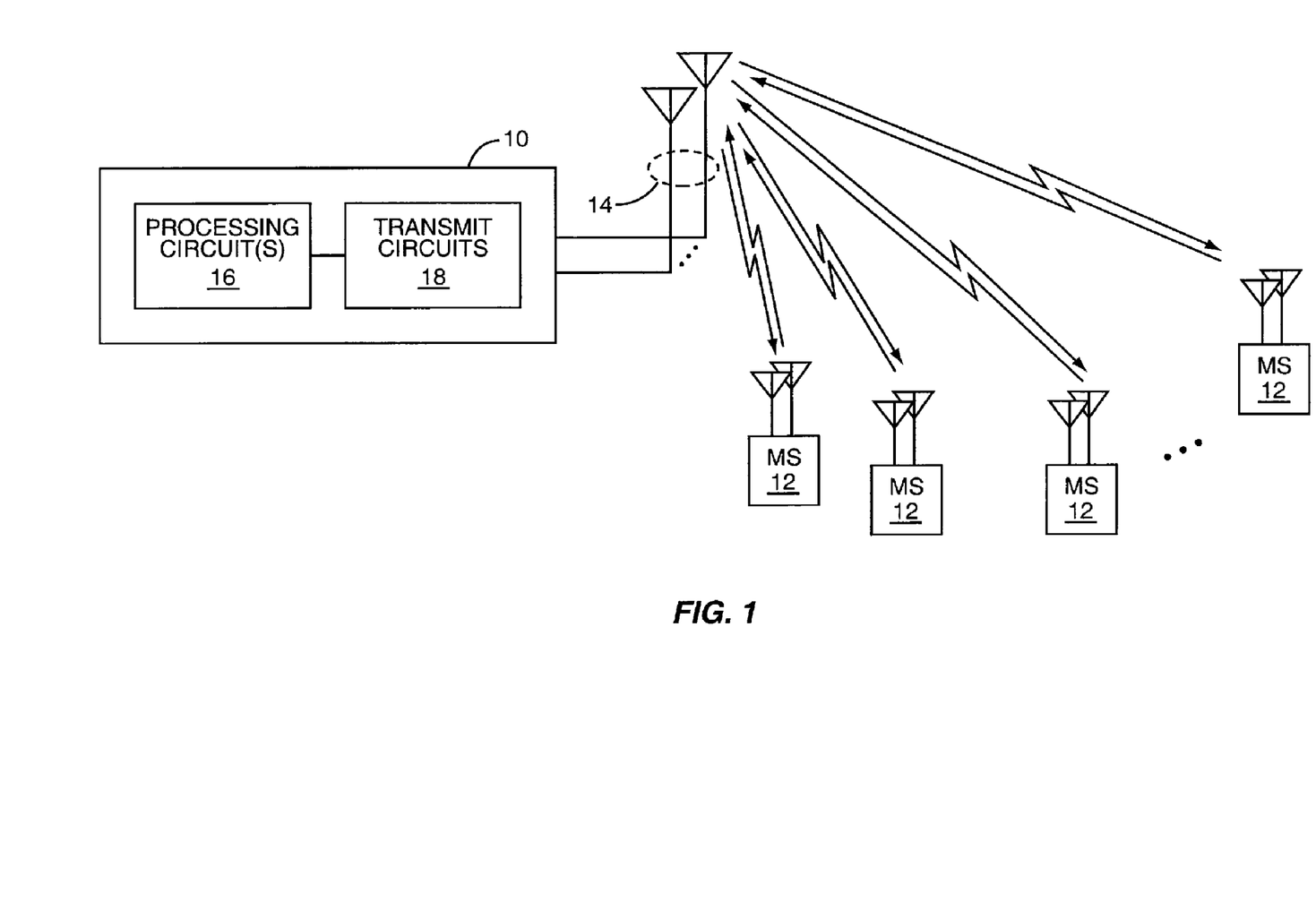
FIG. 1 is a block diagram of one embodiment of a base station configured to transmit a linearly precoded OFDM signal on its downlink in a manner that reduces temporal variations in interference caused by the base station's transmissions.

As a non-limiting example, FIG. 1 illustrates a base station 10 providing service to a plurality of mobile stations 12, based on transmitting a linearly precoded Orthogonal Frequency Division Multiplex (OFDM) signal to the mobile stations 12 via two or more transmit antennas 14. The base station 10 is configured to reduce temporal variations in the interference perceived by the mobile stations 12 (and other mobile stations within range of its transmissions), based on limiting the rate at which it changes its linear preceding settings. To this end, the base station 10 includes one or more processing circuits 16 that are configured to control linear preceding of the OFDM signal transmitted via the base stations' transmit circuits 18.

The base station 10, which may be a base transceiver station (BTS) comprising radio circuits and corresponding transmission control circuits, provides service coverage over one or more "sectors," or "cells." For purposes of simplifying this discussion, it may be assumed that the base station 10 corresponds to one cell in a wireless communication network (not shown), and that a number of such base stations 10 may be geographically distributed to provide an overlapping set of cells providing coverage over a larger area.

In at least one embodiment herein, temporal variations in the interference caused by base station transmissions are reduced by changing the preceding settings used for downlink transmissions in each cell at superframe interval boundaries. A superframe interval may be defined to span a desired number of transmission time intervals (TTIs) or other basic unit of transmission time, used by the base station 10 for scheduling users, adapting transmit rates, etc. Further, the superframe intervals may be synchronized across the collection of cells, such that the interference conditions influenced by the precoding weight sets applied to subcarriers within the OFDM signals being transmitted by the base stations remain fixed in each superframe. These operations improve link adaptation (and thereby improves throughput), as will be detailed later.

Those skilled in the art will appreciate that the base station 10 may, in some embodiments, have additional sets of antennas 14, and may apply the preceding teachings herein to any number of transmitted OFDM subcarriers, such as where it provides multi-sectored transmissions. Those skilled in the art will also appreciate that the architecture of the base station 10 may change, depending upon the particular network standards and protocols with which it is intended to operate. For example, the base station 10 may be configured to operate in a wireless communication network that implements the Third Generation Partnership Project (3GPP) standards for Long Term Evolution (LTE) of Wideband Code Division Multiple Access (WCDMA). Of course, that is a non-limiting example, and various embodiments of the teachings herein apply essentially to any wireless communication network that employs downlink preceding of OFDM signal.

Figure 2:
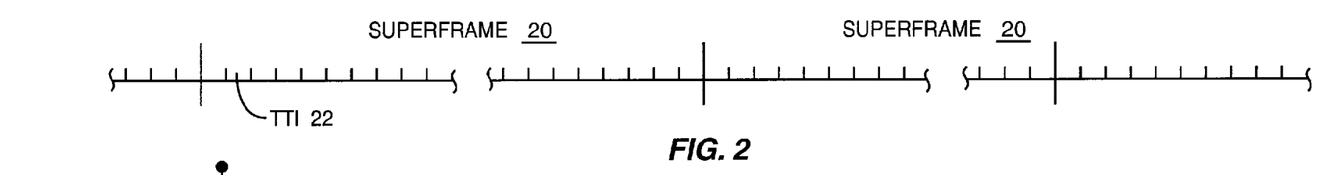
FIG. 2 is a timing diagram illustrating one embodiment of a superframe interval definition, based on underlying Transmission Time Intervals (TTIs).

With this flexibility in mind, FIG. 2 illustrates an example context for defining a superframe 20, as an interval of time spanning a desired number of consecutive Transmission Time Intervals (TTIs). For example, in a given type of communication system, one TTI may represent the shortest interval of time over which individual mobile stations 12 are scheduled for service, and may represent the rate at which the mobile stations 12 generate channel quality reports for link adaptation by their supporting base stations 10. As a non-limiting example, a TTI 22 may comprise 0.5 ms, and a superframe 20 may be defined to span fifty or sixty TTIs 22. Of course, the actual span of each superframe 20 may include a lesser number of TTIs 22, particular if each TTI 22 is longer, e.g., 1 or 2 ms. Further, it should be understood that other transmission intervals, e.g., slots of subframes, may be used to define the superframe span. In general, it is advantageous to define the superframe interval to be at least several multiples of the channel measurement cycle time/link adaptation lag time.

Figure 3:
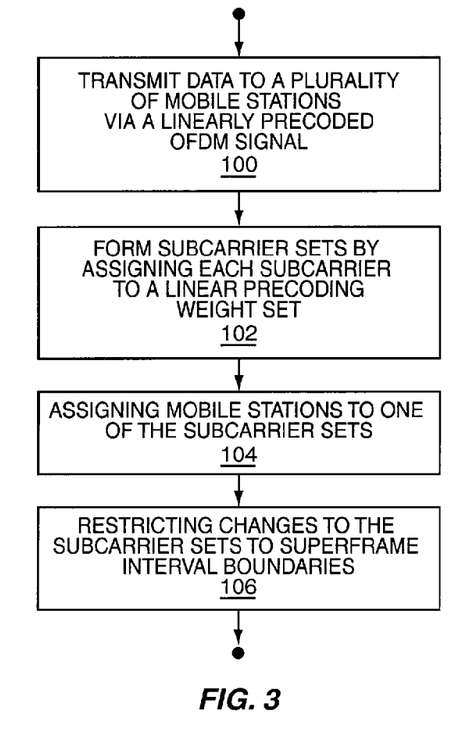
FIG. 3 is a logic flow diagram illustrating processing logic for one embodiment of a method of reducing temporal variations in interference caused by linearly precoded transmissions from a base station.

With the superframe interval appropriately defined for the particular communication network details at issue, FIG. 3 illustrates one embodiment of a method that may be implemented at each cell in a group of one or more communication network cells, e.g., at each one in a group of one or more base stations 10. The illustrated processing may comprise part of a larger set of ongoing transmission and base station control processing at each base station 10, or may be carried out in parallel with other processing. Further, those skilled in the art will appreciate that the processing of FIG. 3 may be implemented in hardware, software, or any combination thereof. For example, the illustrated processing may be carried out by one or more general- or special-purpose microprocessors (e.g., the processing circuits 16 shown in FIG. 1), executing stored computer program instructions corresponding to illustrated processing actions.

The illustrated processing actions "begin" with transmitting data to a plurality of mobile stations 12. In general, a given base station 10 serves a given number of mobile stations 12 within its coverage area (cell). More particularly, the base station 10 transmits a linearly precoded OFDM signal to the plurality of mobile stations 12 (Block 100).

The base station's OFDM signal transmission may represent an ongoing operation, done along with the remaining process actions. In that context, the illustrated processing teaches restricting changes to the linear preceding used for the transmitted OFDM signal to defined superframe interval boundaries. More particularly, there is some number of subcarriers within the OFDM signal available for serving data to the mobile stations 12 being supported by the base station 10. Different ones of the subcarriers in this plurality of subcarriers are linearly precoded according to different linear precoding weight sets in use at the base station 10.

To reduce the rate at which such precoding changes, the processing includes forming subcarrier sets by assigning each subcarrier in the plurality of subcarriers to one of the linear precoding weight sets (Block 102), and assigning each mobile station in the plurality of mobile stations to one of the subcarrier sets (Block 104). The method then preserves the linear precoding settings within each superframe interval by restricting changes to the subcarrier sets to superframe interval boundaries (Block 106).

Figure 4:
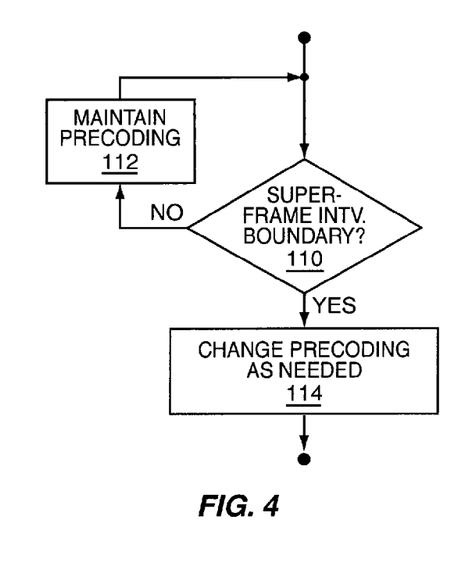
FIG. 4 is a logic flow diagram illustrating one embodiment of additional processing details for the logic flow diagram of FIG. 3.

That is, as shown in FIG. 4, subcarrier set changes, e.g., changing which subcarrier is precoded by which linear precoding weight set, are permitted to occur only at superframe interval boundaries. In more detail, according to FIG. 4, the base station 10 may monitor for superframe interval boundaries, e.g., using timers. Alternatively, superframe interval boundaries may be signaled to it, e.g., by a Radio Network Controller (RNC, not shown). In any case, the base station 10 detects superframe interval boundaries (Block 110) and maintains its current precoding settings if a boundary is not detected (Block 112).

On the other hand, if a superframe interval boundary is detected in Block 110, processing continues with changing the precoding settings as needed (Block 114). The base station 10 may, for example, reduce the number of subcarriers assigned to one of the linear precoding weight sets and increase the number of subcarriers assigned to another one of the linear precoding weight sets.

Figure 5:
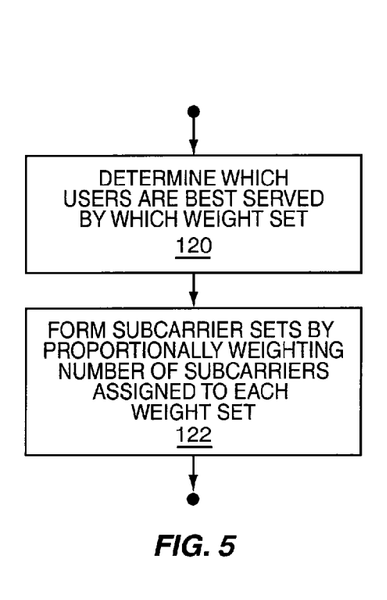
FIG. 5 is a logic flow diagram illustrating one embodiment of additional processing details for the logic flow diagram of FIG. 3.

As shown in FIG. 5, for example, the base station 10 may make precoding adjustments at superframe interval boundaries based on determining which linear precoding weight set in use at the base station 10 is best for serving each mobile station 12 supported by the base station 10 (Block 120). Processing in this embodiment thus continues with forming subcarrier sets by proportionally weighting the number of subcarriers assigned to each linear precoding weight set. Here, "forming" encompasses initially forming subcarrier sets as well as adjusting existing subcarrier sets at superframe interval boundaries. One embodiment of this approach is explained in more detail later herein, set in the context of beamforming, wherein the linear precoding weight sets define different transmit beam directions, and the geometry of individual mobile station locations relative to the base station 10 determine which linear precoding weight set is best for serving each mobile station 12 being supported by the base station 10.

Figure 6:
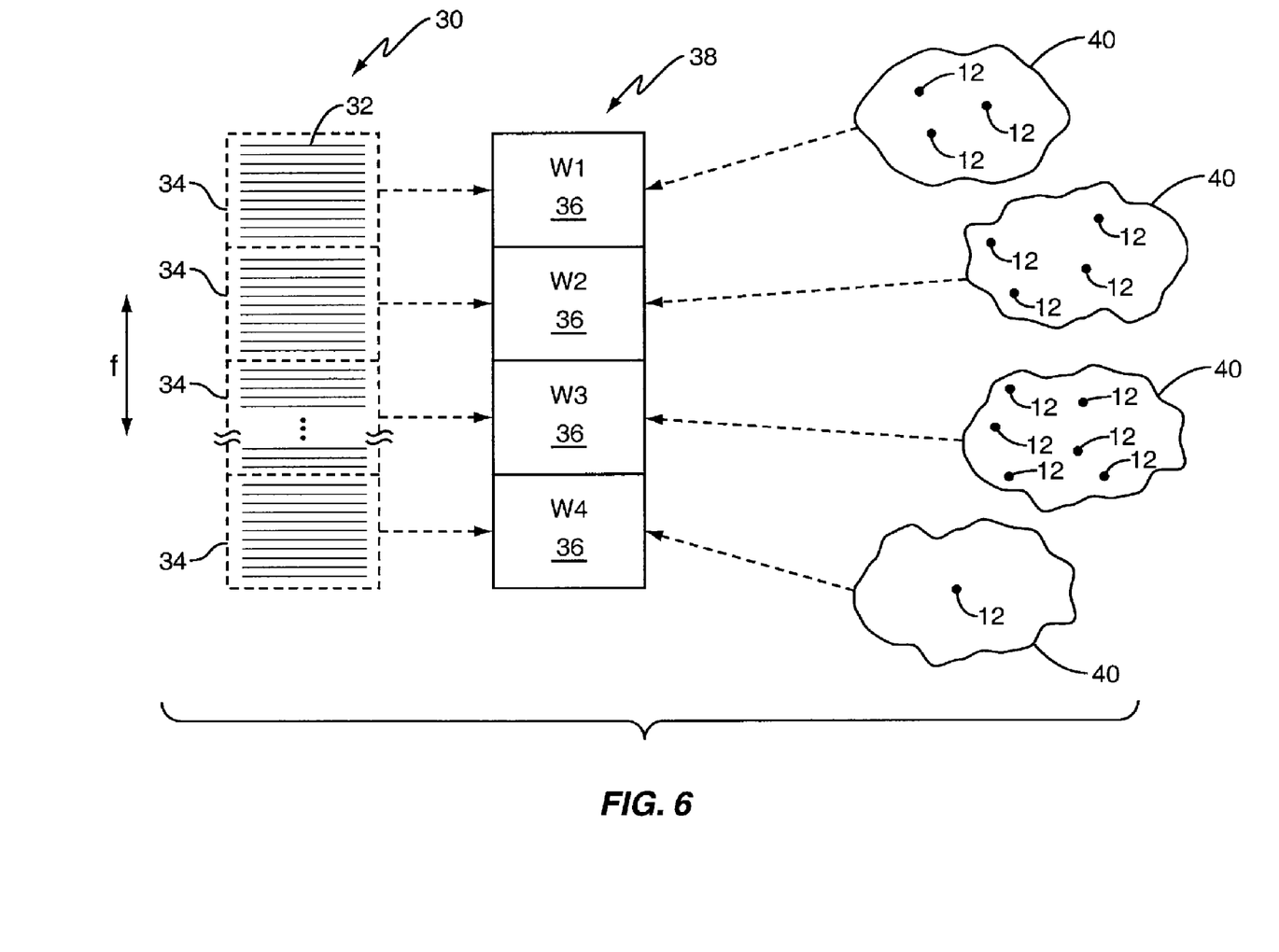
FIG. 6 is a block diagram of one embodiment of a method of forming subcarrier sets by assigning individual OFDM subcarriers to linear preceding weight sets.

However, before turning to beamforming details, FIG. 6 illustrates a broad embodiment of the above precoding-based subcarrier set formation and mobile station assignment processing. FIG. 6 operates as a non-limiting example for the base station 10, wherein a group 30 of individual subcarriers 32 within the OFDM signal transmitted by the base station 10 is subdivided into subcarrier sets 34. For example, the OFDM signal may include a plurality of OFDM subcarriers available for use in transmitting data to the mobile stations 12 being supported by the base station 10, and this plurality of subcarriers may be divided into the subcarrier sets 34.

As shown, each subcarrier set 34 is formed by assigning each subcarrier 32 to one of the linear precoding weight sets 36 within a defined collection 38 of weight sets. While each weight set ("W1," "W2," "W3," and "W4" in the diagram) is denoted by the same reference number "36," it should be understood that each weight set does differ numerically, such that each weight set 36 defines a different set of linear preceding weights—linear precoding matrix—that are applied to the subcarriers 32 within the corresponding subcarrier set 34, for transmission from the two or more transmit antennas 14 at the base station 10 (shown in FIG. 1). According to teachings herein, these subcarrier sets 34 are formed at subcarrier boundary intervals, meaning that precoding settings are fixed within the duration of one superframe at the base station 10 by maintaining the respective assignments of subcarriers 32 to linear precoding weight sets 36 over the superframe.

FIG. 6 further illustrates that a plurality of mobile stations 12 being supported by the base station 10 may be formed into groups 40, by assigning each such mobile station 12 to one of the subcarrier sets 34 (or, equivalently, assigning each such mobile station 12 to one of the linear precoding weight sets 36). In at least one embodiment, the assignment of mobile stations 12 to subcarrier sets 34 is considered part of the preceding settings of the base station 10, and these assignments are maintained over the superframe interval, as well. Of course, such processing does provide for termination or inactivation of service to individual mobile stations as appropriate, and for the admission of new mobile stations as appropriate. New mobile station may be assigned to existing subcarrier sets 34, and/or new subcarrier sets 34 may be formed at the superframe boundary intervals, to accommodate newly added mobile stations.

Further, the base station 10 can be configured to, for each subcarrier set 34, transmit pilot information using the same linear preceding weight set. That is, the base station 10 may be configured to precode pilot information, e.g., include some number of pilot subcarriers, using the same precoding weight sets 36 as used to precode the subcarrer sets 34, to thereby allow a given mobile station 12 to better estimate channel conditions for the particular preceding being used for it.

To that end, each such mobile station 12 may be configured to adjust its channel estimation with respect to the logical grouping of OFDM subcarriers into the subcarrier sets 34. For example, the mobile station 12 may receive all of the OFDM signal's subcarriers, including common control signaling and overhead subcarriers, with only a fraction of those subcarriers linearly precoded via one of the weight sets 36 for carrying data traffic to the mobile station 12.

In that sense, the mobile station 12 may be configured to recognize that its channel estimation process, which may be based on interpolating channel response across frequencies between pilot subcarrier frequency positions, should not span subcarriers subject to different preceding (or no preceding). Thus, the resolution of the mobile station's channel estimation process should be at least as good as the resolution at which the subcarriers are grouped together. Alternatively, or additionally, the mobile station 12 can determine, or can otherwise be informed, regarding which pilot subcarriers are to be used for generating channel estimates for which traffic and control subcarriers that are of interest to the mobile station 12.

Figure 7:
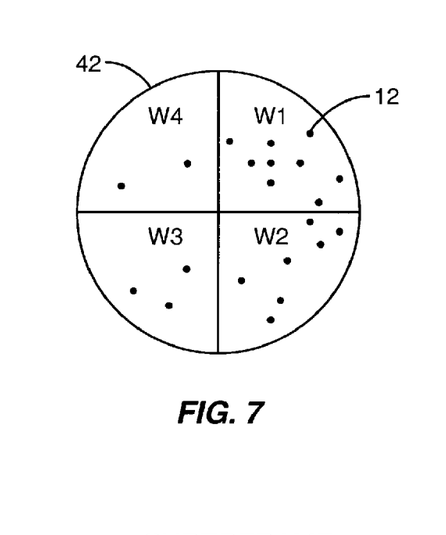
FIG. 7 is a block diagram of segregating a wireless communication network cell into fixed beam directions according to a fixed number of linear precoding weight sets.

Turning back to the diagrams, FIG. 7 elaborates on the earlier-mentioned geometry-based determination of which mobile stations are best served by which linear precoding weight sets. FIG. 7 illustrates that the linear precoding weight sets 36 may operate as beamforming matrices, with each one corresponding to a different beam direction. Thus, assuming that a given one of the base stations 10 defines a cell 42, the collection 38 of linear precoding weight sets 36 defines a number of different beams directions. For linear preceding weight sets W1, W2, W3, and W4 as a non-limiting example, the sector 42 may be divided into four beam directions. With mobile stations 12 represented as dots within the cell 42, one sees that the example illustration contemplates a non-uniform distribution of mobile stations 12 within the cell 42.

Accordingly, the base station 10 may allocate a larger portion of subcarriers 32 from the plurality 30 to beam directions that cover a larger number of mobile stations 12, and/or the base station 10 may allocate portions of subcarriers 32 from the plurality 30 to beam directions as a function of the aggregate user loading for each such direction. In any case, the base station 10 can be configured to form the subcarrier sets 34 by assigning each subcarrier 32 to one of the fixed number of beams, as represented by corresponding ones of linear precoding weight sets 36, and to restrict changes to the subcarrier sets to superframe interval boundaries. That is, the base station 10 may be configured to change beam assignments—which subcarrier 32 is precoded by which linear precoding weight set 36—only at superframe interval boundaries.

Thus, one approach to determining the subcarrier sets 34 is to determine the geometries of the individual mobile stations 12 with respect to their supporting base station 10, and then calculate the portion (number) of subcarriers to allocate to each linear precoding weight set 36 based on how many mobile stations 12 fall within the transmit beam represented by that weight set. Although this calculation may involve literal counts of mobile stations, it also may be driven by the relative counts or ratios, and may be modified or otherwise weighted based on user characteristics, such as Quality-of-Service (QoS) considerations, service types (streaming media, etc.), and various other loading/performance considerations. One approach is to begin with a nominal allocation of subcarriers 32, such as evenly divided allocations among the transmit beams, and then changes such allocations responsive to actual conditions in the cell.

Figure 8:
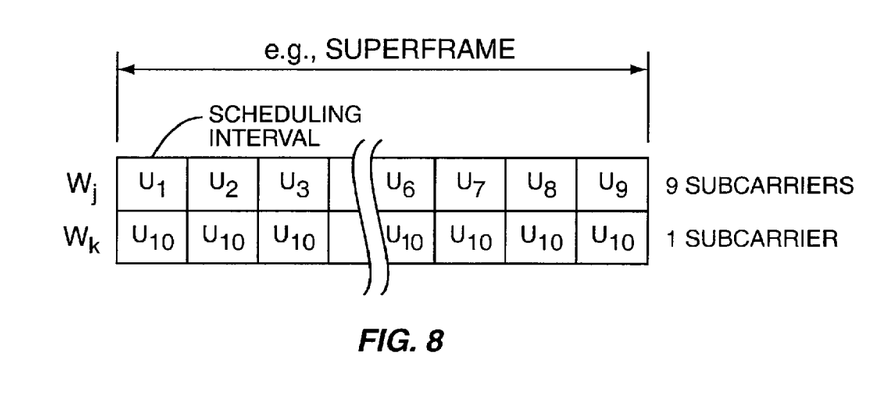
FIG. 8 is a timing diagram of representative ongoing user scheduling within a defined superframe interval.

For example, FIG. 8 illustrates a simplified case for discussion purposes where there are nine mobile stations (denoted as users "U1" through "U9") best served by linear precoding weight set $W_j$ and one mobile station ("U10") best served by linear precoding weight set $W_k$. For a given superframe interval, then, the base station 10 may assign nine subcarriers to the weight set $W_j$, and assign one subcarrier to the weight set $W_k$. The different users may be served during the superframe interval on a scheduled basis, such as where all nine subcarriers being precoded by the weight set $W_j$ are dedicated to each user sharing those subcarriers for a portion of the superframe, while the single subcarrier being precoded by the weight set $W_k$ is used for the lone user on that subcarrier over the whole superframe.

Note that the overall throughput for a user sharing the nine subcarriers versus the user having the single subcarrier may be the same for the superframe interval, given the differences in scheduled service times. Also, note that those skilled in the art will appreciate that the actual allocations of subcarriers and the scheduled use of allocated subcarriers within a superframe interval can be as sophisticated as needed or desired, and may be driven on a TTI-basis within each superframe interval based on the different amounts and types of data to send to individual ones of the mobile stations 12.

Figure 9:
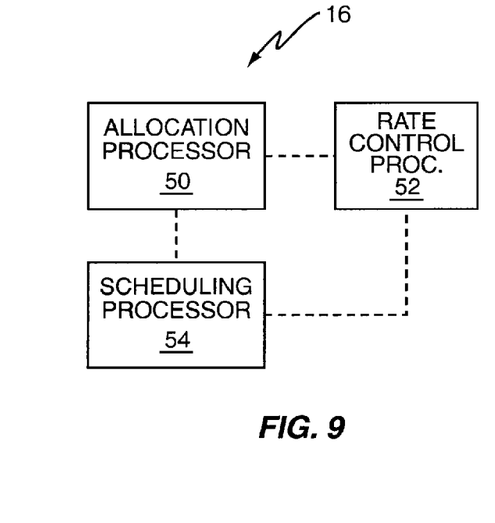
FIG. 9 is a block diagram of one embodiment of functional processing circuits for the processing circuits illustrated for the base station of FIG. 1, for example.

In any case, it should be understood that the one or more processing circuits 16 of the base station 10 may provide a number of supporting functions for managing precoding on a superframe interval basis. For example, FIG. 9 depicts one embodiment where the processing circuits 16 functionally comprise at least an allocation processor 50. The allocation processor 50 is configured to form the subcarrier sets 34, for example, based on determining how many mobile stations 12 in the plurality of mobile stations 12 being supported by the base station 10 are best served by each one of the linear preceding weight sets 36, and proportionally allocating subcarriers 32 from the group 30 to each linear preceding weight set 36. (As noted, rather than being a strict user count, the allocation also can be driven by the aggregate traffic load known or expected for the group 40 of mobile stations 12 that are identified as being best served by each one of the linear preceding weight sets 36.)

The allocation processor 50 may be configured to determine which linear precoding weight set 36 in use at the base station 10 is best for serving each mobile station 12 supported by the base station 10. Alternatively, one or more other, operatively associated processors within the base station 10 may make that determination. The allocation processor 50 also may be operatively associated with a rate control processor 52 and a scheduling processor 54. These additional processors may comprise part of the processing circuits 16, or may be operatively associated with the processing circuits 16.

The scheduling processor 54 is, in one or more embodiments, configured to schedule service to the mobile stations 12 being supported by the base station 10. Such scheduling includes determining the scheduling arrangement within each superframe interval to use for each group 40 of mobile stations 12 that are assigned to each linear precoding weight set 36. See, for example, the simplified scheduling represented in FIG. 8. The scheduling processor 54 also may cooperate with the rate control processor 52, such as by determining how frequently or to what extent given mobile stations 12 should be scheduled for service within a given superframe based on transmit data queue sizes and/or based on the transmit data rates at which they can be served (i.e., based on their relative channel conditions).

Those skilled in the art will appreciate that the scheduling processor 54 may operate in this regard according to a maximum-throughput scheduling objective that attempts to schedule mobile stations 12 in a manner that maximizes aggregate downlink throughput for the base station 10, or according to a fairness-based scheduler, such as a proportionally fair scheduling objective that attempts to provide fair scheduling to different mobile stations 12, in view of their differing channel conditions. Of course, other scheduling algorithms may be used as needed or desired, and the scheduling algorithms may change at the base station 10 as a function of time, loading, etc.

Turning from the scheduling processor 54, the rate control processor 52 may comprise all or part of a link adaptation circuit within the base station 10, which adjusts the transmit rates used for serving individual ones of the mobile stations 12 as a function of channel quality reports, e.g., Channel Quality Indicators (CQIs), received from the individual mobile stations 12. Regardless, the rate control processor 52 is configured to update transmit data rates to individual ones of the mobile stations 12 responsive to channel quality reports received from the mobile stations 12.

As alluded to earlier herein, there generally is a link adaptation lag. That lag may be defined, for example, as the delay between the time a channel quality is measured at a given mobile station 12, and the time that the base station 10 adjusts the transmit data rate being used for transmitting to that mobile station 12 in response to the channel quality report transmitted by that mobile station 12.

The interference conditions measured at each mobile station 12 directly influence the channel quality reports generated by the mobile station 12. Moreover, the preceding settings at use in the mobile station's supporting base station 10 and at neighboring base stations 10 directly influence the characteristics of that measured interference. Advantageously, then, fixing the precoding settings over superframe intervals that may be many multiples of the mobile station's channel quality measurement cycle effectively makes the precoding related component of interference seen by the mobile stations 12 a quasi-stationary process over the superframe interval. That is, the statistics of base station interference at the mobile stations 12 can be accurately estimated over succeeding channel measurement cycles because of the fixed precoding settings used by the base stations 10 within each superframe interval. The errors in link adaptation that would otherwise arise if precoding settings changed rapidly relative to the link adaptation lag time are thereby eliminated.

Figure 10:
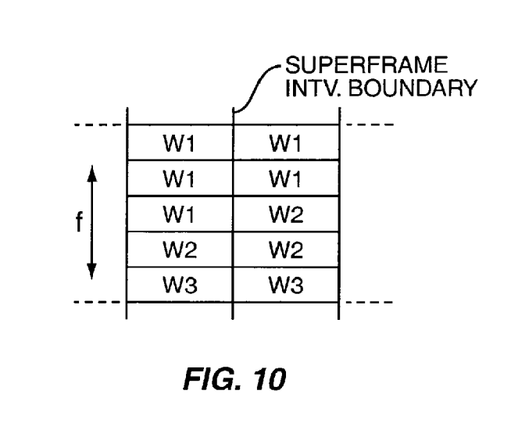
FIG. 10 is a timing diagram illustrating the adjustment of preceding settings at a superframe interval boundary.

FIG. 10 illustrates an additional aspect of reducing temporal variations in interference contemplated for the preceding method taught herein. According to a basic approach, a given base station 10 restricts changes to its precoding settings to superframe interval boundaries, e.g., it changes which subcarriers 32 are precoded with which linear precoding weight sets 36 as needed at superframe interval boundaries. (These changes may, for example, be driven by changing loading and reception conditions.) However, as suggested by FIG. 10, the base station 10 may further reduce temporal variations in interference by making the needed changes in a manner that minimizes at any given superframe interval boundary the number of subcarriers that are changed from one precoding weight set to another.

In more detail, FIG. 10 illustrates that the first superframe to the left of the illustrated superframe interval boundary included three subcarriers 32 assigned to weight set W1, one assigned to weight set W2, and one assigned to weight set W3. In response to needed changes at the boundary, the base station 10 takes the W1 subcarrier in the first superframe adjacent in frequency to the W2 subcarrier, and changes its linear precoding weight set assignment to W2. Thus, rather than selecting a non-contiguous subcarrier or rearranging more than one subcarrier assignment, the base station 10 (e.g., allocation processor 50) strategically selects which subcarrier assignments to change, to minimize the overall number of subcarrier-to-weighting-set assignments that are changed at the superframe interval boundary.

Figure 11:
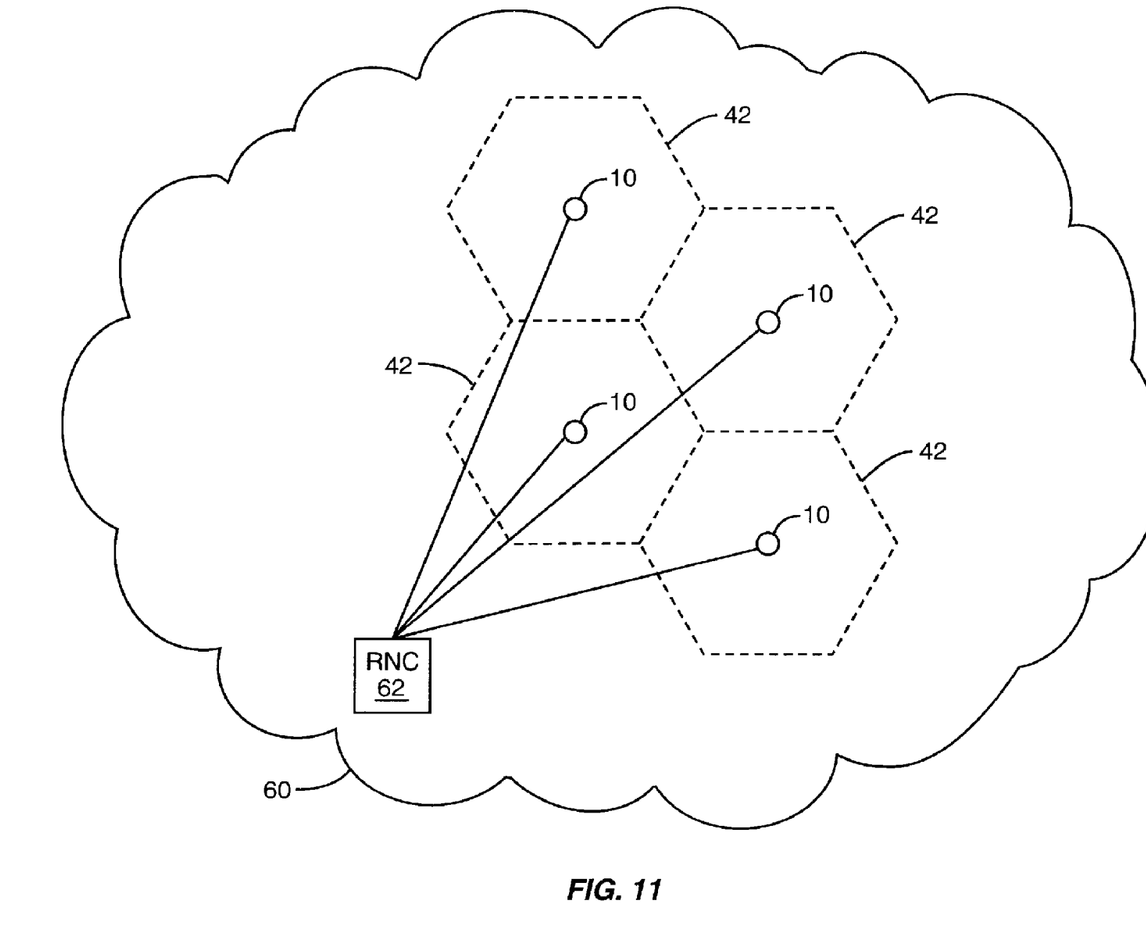
FIG. 11 is a block diagram of one embodiment of a wireless communication network, presented in simplified form, which includes a number of base stations/network cells across which linear precoding adjustments are synchronized on superframe interval boundaries.

Of course, independent of whether the enhancement of FIG. 10 is practiced or not, significant gains in overall downlink throughput may be obtained in a given network by coordinating the superframe-based precoding method across all base stations 10 within a wireless communication network, or at least across all of the base stations 10 within a given area of a network. FIG. 11 provides a non-limiting example of this extension.

In FIG. 11, a wireless communication network 60 includes a plurality of base stations 10, which may be communicatively coupled together via a Radio Network Controller (RNC) or other entity within the network 60. The RNC 60 may be configured to synchronize precoding of superframes across the base stations 10. Additionally, or alternatively, the base stations 10 may include sidehaul connections between them, which support synchronization of precoding superframes across them. Still further, each base station 10 may have access to the same reference timing source (not explicitly shown), such as by having a common timing reference source and/or by including a common means of deriving timing information, e.g., GPS-based timing circuits. In any case, it should be understood that one or more wireless communication network embodiments contemplated herein comprise a plurality of base stations 10 that are configured to synchronize their superframe interval boundaries, such that precoding changes occur at superframe interval boundaries, and those boundaries are common across the base stations 10.

With the above multi-station synchronization, the precoding settings in each cell 42 defined by one of the base stations 10, are fixed within each superframe interval. Moreover, the superframe interval boundaries are synchronized across the cells 42. With this approach, the precoding-related interference characteristics are converted to a quasi-stationary process within each superframe interval, from the perspective of mobile stations 12 operating within the cells 42. As such, the potentially significant changes in other-cell interference that arise from changes in precoding are eliminated, at least within superframe intervals.

For example, with four transmit antennas 14 at the base stations 10, and two receive antennas at each mobile station 12, linear precoding can increase throughput for the network 60 as compared to no precoding by as much as 50%. That gain, however, assumes instantaneous channel knowledge at the base stations 10 with respect to each mobile station 12, which is not possible in practice. Thus, as taught herein, the base stations 10 in a number of cells 42 fix their precoding settings within each superframe, but allow the settings to change at superframe interval boundaries.

This approach can be shown to eliminate the temporal variation of other-cell interference due to switching of precoding weights. While this type of fixed-weight reuse does result in some loss in statistical multiplexing, the gains obtained with fixed-weight reuse outweigh the statistical multiplexing losses, at least for medium to high loads within the base stations' cells 42. For example, simulations show that, for the four-antenna base station and two-antenna mobile station case, the fixed precoding approach taught herein can increase the cell throughput by approximately 44% compared to the otherwise identical system.

To better appreciate these advantages, one may focus on the signal received by a given mobile station 12 from its supporting base station 10, which is denoted by the subscript "0." The signal can be represented as, $$y[f;n] = G_0[f;n]W_0[f;n]s_0[f;n] + \sum_{k=1}^{N_b} G_k[f;n]W_k[f;n]s_k[f;n] + v_0[f;n] + v_0[f;n],$$ Eq. (1)

where f is a subcarrier frequency index (f=1, ..., $N_f$), $N_f$ is the number of subcarriers; n denotes the transmission interval index (e.g., the TTI index), $G_0[f;n]$ is the channel matrix between the 0-th base station 10 and the mobile station 12, $W_0[f;n]$ is the precoding weight set in use at the 0-th base station 10 for transmitting to the mobile station 12, and $s_0[f;n]$ is the vector of symbols transmitted by the 0-th base station 10 to the mobile station 12. Further, with respect to other base stations 10, $G_k[f;n]$ is the $(n_R, n_T)$ channel matrix between the k-th base station and the mobile station 12, $s_k[f;n]$ is the vector of symbols that is transmitted by the k-th base station 12; $W_k[f;n]$ is a $(n_T, n_S)$ precoding matrix that is used by the k-th base station 12; and $v_0[f;n]$ is the Gaussian thermal noise present at the mobile 12 and is independent across subcarriers.

Assuming that the symbols transmitted over different transmit beams (as defined by the linear precoding weight sets 36), are independent, one may express the expected symbol value as:

$$E\{s_k[f;n]s_k^\dagger[f;n]\}=I(n_S,n_S).$$ Eq. (2)

Use i[f;n] to denote the other-cell interference term in Eq. (1) as:

$$i[f;n] = \sum_{k=1}^{N_b} G_k[f;n]W_k[f;n]s_k[f;n].\quad\text{Eq. (3)}$$

Further, denote the noise-plus-interference at the mobile station 12 by:

$$v[f;n]=i[f;n]+v_0[f;n].\quad\text{Eq. (4)}$$

Thus, assuming that $E\{v_0[f;n]v_0^\dagger[f;n]\}=N_0I$, one sees that the covariance matrix of noise-plus-interference at the mobile station 12 is given as, $$K_{vv}[f;n] = \sum_{k=1}^{N_b} G_k[f;n]W_k[f;n]W_k^\dagger[f;n]G_k^\dagger[f;n] + N_0I.\quad\text{Eq. (5)}$$

In general, $W_k[f;n]$ depends on the long-term statistics of the channel between the k-th base station 10 and the mobile station 12 that is being served by the k-th base station 10 in the n-th TTI. The statistics of the channel of each mobile station 12 varies very slowly, thus the best linear precoding matrix for a mobile station changes very slowly over time. In other words, the best linear preceding weight set for a given mobile station 12 depends mostly on the geometry of the location of the mobile relative to its serving base station 10, and this geometry varies quite slowly compared to fast fading.

In a conventional approach, a given base station employing linear preceding on its OFDM downlink would schedule individual ones of the mobile stations it was supporting on a per-TTI basis, and correspondingly adapt its linear preceding matrix or matrices as rapidly as each TTI, to suit the different geometries of the mobile stations being served. That is, if the direction of the mobile station served in one TTI was different than the direction of the mobile station served in the next TTI, the linear preceding matrix would be changed between those TTIs to reflect the different directions.

In turn, changing the linear preceding matrix rapidly (e.g., per TTI) changes interference conditions rapidly, and in a potentially significant manner. Rapid interference changes mean that the interference conditions may change significantly between the time that the a nearby mobile station reports its channel quality, and the time that the mobile station's supporting base station attempts to serve the mobile station at a data rate set according to earlier channel quality report. This delay is a form of link adaptation lag, and it means that a given base station's transmit data rate adjustments may not keep up with interference changes at the mobile stations it is serving.

In contrast, according to the teachings herein, each base station 10 in a group of one or more base stations 10 fixes its linear preceding settings over intervals of time substantially longer than the link adaptation lag. For example, by fixing the assignments of subcarriers to linear precoding weight sets over superframe intervals, which are longer than one TTI, the precoding-related element in the interference covariance calculation given in Eq. (5) becomes fixed for the duration of the superframe. For example, in an embodiment where a TTI comprises 0.5 ms, a superframe interval may span fifty to sixty TTIs, or more. The particular duration of the superframe interval adopted is a matter of implementation, and may vary depending upon network type.

In more detail, in one or more embodiments, each of one or more base stations 10 restrict their linear preceding weights to take a finite number of fixed values. In one such example, each base station 10 restricts a beamforming matrix to take a finite number of fixed values (i.e. the base station 10 restricts itself to use fixed beams only). Let $N_B$ denote the number of fixed beams allowed for the OFDM signal transmitted from each base station 10, and let $\{\theta_l\}_{l=1}^{N_B}$ denote the allowed beamforming angles. At each base station 10, each subcarrier in a plurality of subcarriers, e.g., from a plurality of subcarriers being used for transmitting traffic, is assigned to one of the fixed beams. One may let $B_k[f]$ denote the beamforming angle used on the f-th sub-carrier at the k-th one of the base stations 10. These assignments are held fixed during a superframe interval, but are allowed to change as needed at superframe interval boundaries.

With the above arrangement, the $W_k[f;n]$ component of Eq. (5) is unchanging over a superframe interval, which is defined to be at least several multiples of the link adaptation lag of the base stations 10, and which may span many TTIs (e.g., 50 or 60). Further, because the channel conditions $G_k[f;n]$ also change slowly relative to one TTI, one sees that the noise-plus-interference covariance $K_{vv}[f;n]$ observed by each mobile station 12 generally will not vary significantly from one TTI to the next. With more stable interference conditions, the transmit link adaptation lag becomes less significant. That is, the delay between receiving an interference-based channel quality report and the supporting base station's corresponding transmit data rate adjustment for transmitting to the reporting mobile station 12, which may be two or three TTIs, becomes much less significant when the interference conditions are substantially unchanged over that delay.

Note that there are numerous options for the mapping $B_k[f]$ that is used in the k-th base station 10. Assuming that each base station 10 corresponds to a "cell" in the wireless communication network 60 shown in FIG. 11, then, for each cell, one may allocate a number of adjacent subcarriers to the same beam. For example, one might allocate all the subcarriers in an OFDM "chunk" to the same beam. Further, the portion of subcarriers allocated to a given beam could be proportional to the aggregate average load of the mobile stations 12 that fall in this beam. With this arrangement, all of the cells can synchronously change their beam allocations at regularly defined instances (e.g. every superframe).

Of course, to the extent that beam allocations are changed at a superframe interval boundary, there may be some brief mismatch between reported and actual channel qualities. However, these instances occur infrequently relative to the TTI interval time and their impact therefore is small and can be handled by Automatic Repeat request (ARQ) to the extent necessary. For example, if suddenly in a particular cell there is a large file to transmit on the downlink to a targeted mobile station 12, most of the subcarriers in the cell can be allocated temporarily to the beam that is best for the targeted mobile station 12. Alternatively, if there is just one mobile station operating in a cell, all the (data) subcarriers in that cell could be allocated to the beam that is best for that one mobile station 12.

Thus, according to the teachings herein, each base station 10 in a group of one or more base stations 10, fixes its linear precoding settings for extended intervals to thereby reduce temporal variations in the interference its transmissions cause at mobile stations operating in and around the base station's coverage area. The extended interval, e.g., a superframe, is defined to be at least several multiples of the link adaptation lag of the base stations, and may comprise many TTIs.

As one example, each cell in a group of cells may fix the beamforming weights (i.e., the precoding matrix) used on each subcarrier in the cell over each superframe, and change those weighting assignments at superframe boundaries. With this approach, the temporal variation of other-cell interference at individual mobile stations 12 due to changing precoding settings at the base stations 10 can be entirely eliminated, at least within superframe intervals. Although this approach forfeits statistical multiplexing gains available with accurate/instantaneous channel quality information, the fixed-beam reuse proposed herein is believed to provide better real-world performance, at least for medium to high traffic loads.

As another example, a method of reducing temporal variations in interference perceived by mobile stations 12 operating in a wireless communication network 60 comprises transmitting linearly precoded OFDM signals from a plurality of network base stations 10, restricting linear precoding at each base station 10 to a defined set of linear preceding weight sets, and changing linear preceding settings across the plurality of network base stations 10 synchronously only at superframe interval boundaries. (Where a superframe interval is defined to be at least several multiples of a link adaptation lag time existent in ongoing link adaptations performed by the network base stations with respect to individual ones of the mobile stations.)

Changing precoding settings comprises, in at least one embodiment, changing which subcarriers are linearly precoded with which ones of the linear preceding weight sets in use at each network base station 10. Further, forming the subcarrier sets may comprise, at each base station 10, assigning each subcarrier in a plurality of subcarriers within the OFDM signal transmitted by the base station 10 to one in a set of linear preceding weight sets in use at the base station 10, and assigning individual ones in a plurality of mobile stations 12 being supported by the base station 10 to one of the subcarrier sets. With that arrangement, changing the linear precoding settings across the plurality of base stations 10 synchronously only at superframe interval boundaries comprises, at each base station 10, maintaining the subcarrier sets and the assignments of mobile stations 12 to subcarrier sets at least for the duration of each superframe interval.

Broadly, one or more embodiments presented herein reduce temporal variations in interference perceived by mobile stations operating in a wireless communication network. This beneficial effect is obtained by maintaining fixed linear preceding settings at each base station 10 in a plurality of base stations 10 over a superframe interval that is substantially longer than a link adaptation interval associated with the base stations 10 updating transmit data rates to individual ones of the mobile stations 12, as a function of changing channel and interference conditions, and further by changing, as needed, the fixed linear preceding settings at each base station synchronously at the superframe interval boundaries.

However, those skilled in the art will appreciate that the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of reducing temporal variations in interference in a wireless communication network comprising, at each of one or more base stations:
   transmitting data to a plurality of mobile stations via an Orthogonal Frequency Division Multiplex (OFDM) signal comprising a plurality of subcarriers transmitted from two or more transmit antennas according to a fixed number of linear preceding weight sets;
   forming subcarrier sets by assigning each subcarrier to one of the linear preceding weight sets;
   assigning each mobile station to one of the subcarrier sets; and
   restricting changes to the subcarrier sets to superframe interval boundaries, including changing the subcarrier sets as needed at superframe interval boundaries in response to changing loading conditions, and further making said changes to the subcarrier sets in a manner that minimizes the number subcarriers that are changed from one precoding weight set to another;
   wherein a superframe interval is defined to be at least several multiples of a channel quality measurement cycle time associated with the mobile stations; and
   wherein the channel quality measurement cycle time is a link adaptation lag associated with the base station updating transmit data rates to individual ones of the mobile stations responsive to receiving channel quality reports from the mobile stations.

2. The method of claim 1, wherein the one or more base stations comprise a plurality of base stations in the wireless communication network, and further comprising synchronizing the superframe interval boundaries across the plurality of base stations.

3. The method of claim 1, wherein forming subcarrier sets by assigning each subcarrier to one of the linear precoding weight sets comprises determining how many mobile stations in the plurality of mobile stations are best served by each one of the linear precoding weight sets, and proportionally weighting the number of subcarriers assigned to each linear precoding weight set.

4. The method of claim 3, further comprising determining which mobile stations are best served by which linear precoding weight set based on relating transmit beam directions represented by the linear precoding weight sets to geometries of locations of the mobile stations relative to the base station.

5. The method of claim 1, further comprising, for each subcarrier set, transmitting pilot information using the same linear precoding weight set as used for the subcarrier set.

6. The method of claim 1, wherein the fixed number of linear precoding weight sets comprise a number of beamforming matrices that restrict beamforming of the OFDM signal to a fixed number of beams at fixed beam angles.

7. The method of claim 6, wherein forming subcarrier sets by assigning each subcarrier to one of the linear precoding weight sets comprises assigning each subcarrier to one of the fixed number of beams, and wherein restricting changes to the subcarrier sets to superframe interval boundaries comprises changing which subcarriers are assigned to which beam only at superframe intervals.

8. The method of claim 1, further comprising scheduling service to the mobile stations assigned to each subcarrier set over the duration of the superframe.

9. A base station configured to reduce temporal variations in interference caused by its transmissions, said base station comprising:
   transmission circuits configured to transmit data to a plurality of mobile stations via an Orthogonal Frequency Division Multiplex (OFDM) signal comprising a plurality of subcarriers transmitted from two or more transmit antennas according to a fixed number of linear precoding weight sets; and
   one or more processing circuits configured to:
      form subcarrier sets by assigning each subcarrier to one of the linear precoding weight sets;
      assign each mobile station to one of the subcarrier sets; and
      restrict changes to the subcarrier sets to superframe interval boundaries;

wherein a superframe interval is defined to be at least several multiples of a channel quality measurement cycle time associated with the mobile stations; and wherein the base station includes a rate controller that is configured to update transmit data rates to individual ones of the mobile stations responsive to channel quality reports received from the mobile stations, and wherein the channel quality measurement cycle time is a lag time between receiving a channel quality report from a given mobile station and correspondingly updating a transmit data rate for transmitting to that given mobile station; and wherein the base station is configured to change the subcarrier sets as needed at superframe interval boundaries in response to changing loading conditions, and further configured to change the subcarrier sets in a manner that minimizes at any given superframe interval boundary the number of subcarriers that are changed from one linear precoding weight set to another.

10. The base station of claim 9, wherein the base station comprises one in a plurality of base stations within a wireless communication network, and wherein the plurality of base stations are configured to synchronize the superframe interval boundaries across the plurality of base stations.

11. The base station of claim 9, wherein the one or more processing circuits include an allocation processor that is configured to form the subcarrier sets based on determining how many mobile stations in the plurality of mobile stations are best served by each one of the linear precoding weight sets, and proportionally allocating subcarriers to each linear precoding weight set.

12. The base station of claim 11, wherein the allocation processor or an associated processor within the base station is configured to determine which mobile stations are best served by which linear precoding weight set based on relating transmit beam directions represented by the linear precoding weight sets to geometries of locations of the mobile stations relative to the base station.

13. The base station of claim 9, wherein the base station is configured to, for each subcarrier set, transmit pilot information using the same linear precoding weight set as used for the subcarrier set.

14. The base station of claim 9, wherein the fixed number of linear precoding weight sets comprise a fixed number of beamforming matrices that restrict beamforming at the base station to a fixed number of beams at fixed beam angles.

15. The base station of claim 14, wherein the base station is configured to form the subcarrier sets by assigning each subcarrier to one of the fixed number of beams, and to restrict the changes to the subcarrier sets to superframe interval boundaries by changing which subcarriers are assigned to which beam only at superframe intervals.

16. The base station of claim 9, wherein the one or more processors further comprise a scheduling processor configured to schedule service to the mobile stations assigned to each subcarrier set over the duration of the superframe.

* * * * *